E. MORGAN.
CORN-PLANTER.
No. 176,190. Patented April 18, 1876.
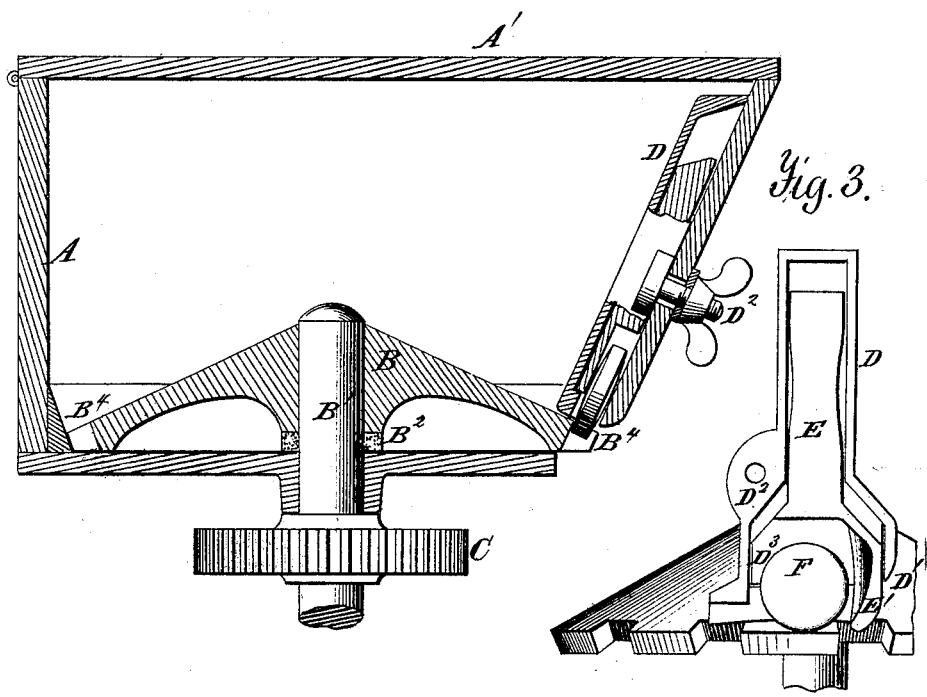
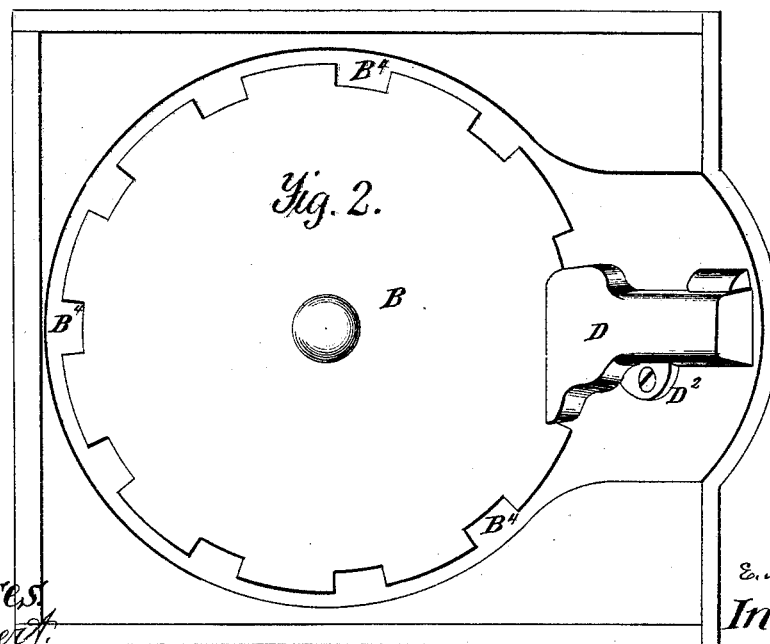

ded on a washer, B². It is revolved by the
UNITED STATES PATENT OFFICE.

EDMOND MORGAN, OF DUBLIN, INDIANA.

IMPROVEMENT IN CORN-PLANTERS.

Specification forming part of Letters Patent No. 176,190, dated April 18, 1876; application filed February 16, 1876.

*To all whom it may concern:*

Be it known that I, EDMOND MORGAN, of Dublin, in the county of Wayne and State of Indiana, have invented a new and useful Improvement in Corn-Planters, of which the following is a specification:

My invention relates to the mechanism of a corn-planter, which is intended to regulate the dropping of the grains, seed by seed, and to prevent two grains passing at the same time. This is generally accomplished by a brush, which wears off, and requires frequent regulation.

My improvement consists of a metallic cut-off, which prevents more than one seed passing at a time; and also in the use of a wheel, which, running on the margin of the feed-wheel, falls successively into the holes through which the grains pass and drive out any grain which may lodge in the hole, thus insuring the accurate operation of the machine.

In the annexed drawing, making part of this specification, Figure 1 is a central longitudinal section of the hopper and feed mechanism. Fig. 2 is a plan view, looking down into the hopper, the cover being removed. Fig. 3 is an elevation, showing the feed-wheel and chambered cut-off as it would be seen if the hopper were transparent.

The same letters are employed in all the figures in the indication of the same parts.

A is the hopper, in which the grains of corn are placed. A' is the cover of the hopper, hinged to it on one edge. An opening is formed through the hopper for the grains to drop through as they are supplied by the feeding mechanism. The feed-wheel B is conical, so that the grains will run down to the edge. It is carried on the central vertical shaft B¹, its central boss being supported on a washer, B². It is revolved by the pinion C. A series of notches, B⁴, are cut in the edge of the feed-wheel to receive the grains of corn, which are carried on the bottom of the hopper until they fall out through the opening made for the purpose. This opening is covered by the shield D, which has a space for the seeds to pass at D¹, and is fastened to the hopper by the screw and thumb-nut D². The shield is concave, to receive between its inner face and the hopper the cut-off E, which has a free vertical play, the shield being formed with a shoulder at D³ to catch the lower edge of the cut-off and prevent its bearing on the face of the feed-wheel, which would wear away the latter.

A point, E', projects from the lower edge of the cut-off to fill the space D¹. It is curved, as shown in Fig. 3, where the seeds pass under it, to prevent the grains from passing more than one at a time, and properly disposing this grain lengthwise in the notch B⁴.

The cut-off is chambered, as shown, to receive the circular disk F and allow it to play freely in the recess. It runs on the surface of the edge of the conical feed-wheel, and, as the notches come successively under it, it will fall into them far enough to strike any lodging grain and drive it out, and then rise over the edge of the notch and travel on the solid surface of the feed-wheel.

It is manifest that the cut-off may be used independently of the disk F; and that the form of the shield may be varied, or the cut-off suspended and confined by other means than the shield so long as the latter is confined against the hopper to exclude other grains than the one held in the recess of the feed-wheel. Also, that the mechanism can be equally well adapted to a flat feed-wheel and substituted for the brush in the great variety of machines in use. Such modifications in form and adaptation will readily suggest themselves to any skillful mechanic acquainted with the construction of such machines. Pins or other stops may also be substituted for the shoulder D³.

What I claim as my invention, and desire to secure by Letters Patent, is—

1. The gravitating cut-off E E', for separating the grains and allowing only one to pass with the notch in the feed-wheel to the discharge-opening, substantially as set forth.

2. In combination with the feed-wheel B and cut off E, the chambered shield D, substantially as set forth.

3. In combination with the feed-wheel and shield cut-off, the shield, constructed with a shoulder, D³, to prevent the cut-off from bearing on the wheel.

4. In combination with the chambered gravitating cut-off E, the disk F, revolving in the recess and on the face of the feed-wheel, substantially as set forth.

5. In combination with the feed-wheel, the shield D, the cut-off E, and the disk F, substantially as set forth.

In testimony whereof I have signed my name to this specification in the presence of two subscribing witnesses.

EDMOND MORGAN.

Witnesses:
 J. S. BELL,
 H. B. JOHNSON.